(Model.)
J. W. LIGHTFOOT.
GATE.
No. 337,597. Patented Mar. 9, 1886.
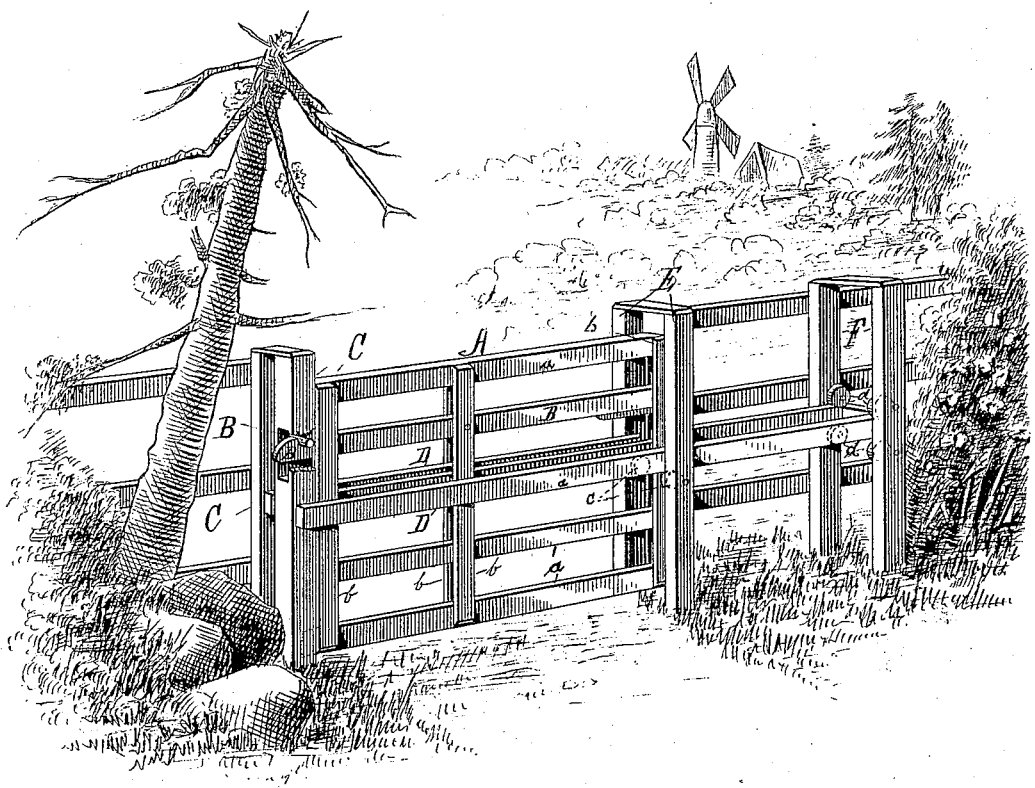
Witnesses:
W H Boltz
Jared Irwin
Inventor.
John William Lightfoot

UNITED STATES PATENT OFFICE.

JOHN WILLIAM LIGHTFOOT, OF KESWICK, IOWA.

GATE.

SPECIFICATION forming part of Letters Patent No. 337,597, dated March 9, 1886.

Application filed June 4, 1885. Serial No. 167,661. (Model.)

*To all whom it may concern:*

Be it known that I, JOHN WILLIAM LIGHTFOOT, a citizen of the United States, residing at Keswick, county of Keokuk, and State of Iowa, have invented a new and useful Improvement in Gates, of which the following is a specification.

My invention relates to improvements in that class of gates known as "sliding" gates, in which the gate slides on rollers mounted on posts at one side of the gate-opening; and the invention will first be described, and then specifically set forth in the claims.

The drawing shows in perspective the gate in its closed position.

A represents the gate, which is composed of the bars $a$ and the uprights $b$ on opposite sides of the bars. Between the two middle uprights a counterbalanced latch, B, is pivoted, the latch extending beyond the front end of the gate, and having a notch on the upper side of said projecting end. A catch, B', is provided in one of the posts C C for the latch to engage. The posts C C are set a short distance apart, as shown. To opposite sides of the gate are secured the longitudinal guide-rails D, the forward ends of which project a short distance in advance of the front edge of the gate, to receive between them the latch-post C, so that strain is taken from the latch. The rear ends of the guide-rails D extend some distance in rear of the gate and rest on single rollers $c\ c$ on the inner sides of posts E E, between which the gate slides, and between two pairs of rollers, $d\ d\ d\ d$, mounted on the inner sides of another pair of posts, F F. The weight of the gate is thus supported by the rollers, and a very easily-moving gate is afforded by the above-described construction. The lower bar, $a$, of the gate projects beyond the front edge of the gate, as shown in dotted lines, Fig. 1, so as to enter a notch in one of the posts C C, and prevent the lower forward corner of the gate from being pushed out of place by animals—such as hogs—and this projecting rail, in connection with the projecting ends of the guide-rails, effectually removes all strain from the latch B, which would otherwise be subjected to considerable strain from storms, animals, &c. When the gate is opened, the entire space between the posts C and adjacent posts E is free for the passage of teams, &c., and the gate may slide back without striking the rollers at any time, by reason of the rollers being on the inner sides of the posts and receiving the guide-rails only.

I am aware that the top and bottom rails of the gate have been extended in front of the gate to enter sockets in the post, and extended also in rear of the gate to slide between grooved rollers on posts, the rails being beveled to fit the rollers, and the gate being operated and held closed by a jointed operating-rod; also, that two posts have been connected by a rail on which and a roller on the lower part of the forward post a gate was mounted to slide, the longitudinal rails of the gate being extended to enter the space between the double gate-post having a fastening-lever; also, that a gate has been provided with two rollers on opposite sides of the upper rear end working on the tops of two rails, between which the gate slides; and this gate had also two rollers on opposite sides of its lower forward corner, working on tracks extending across the roadway; also, that a gate has had its top rail extended rearwardly between two pairs of rollers, the top and bottom rails being extended in front to enter sockets in the gate-post; and I do not claim such constructions as of my invention.

What I claim as new, and desire to secure by Letters Patent, is—

1. In a farm-gate, the spaced posts C C, one of which has a catch, in combination with the gate A, having the rails $a$ and uprights $b$, the latch B, the longitudinally-arranged guide-rails D D, projecting a short distance in front of the gate to receive a post, C, between them, and extended in rear of the gate, the posts E E, having rollers $c\ c$, and the inner posts, F F, having the rollers $d\ d\ d\ d$ on their inner sides, to receive and support the guide-rails, substantially as set forth.

2. The combination, with the spaced posts C C, one having a catch, the spaced posts E E, having rollers $c\ c$ on their inner sides, and the spaced posts F F, having rollers $d\ d\ d\ d$ on their inner sides, of the gate A, having a latch, B, longitudinal guide-rails D D, projecting in front of the gate to engage the latch-post C, extending rearward and resting on rollers $c\ c$ and between the rollers $d\ d\ d\ d$, the lower rail, $a$, of the gate projecting in front of the gate and adapted to enter a notch in one of the posts C C, substantially as set forth.

JOHN WILLIAM LIGHTFOOT.

Witnesses:
W. H. BALTZ,
J. B. A. ROBERTSON.